Figure 2:
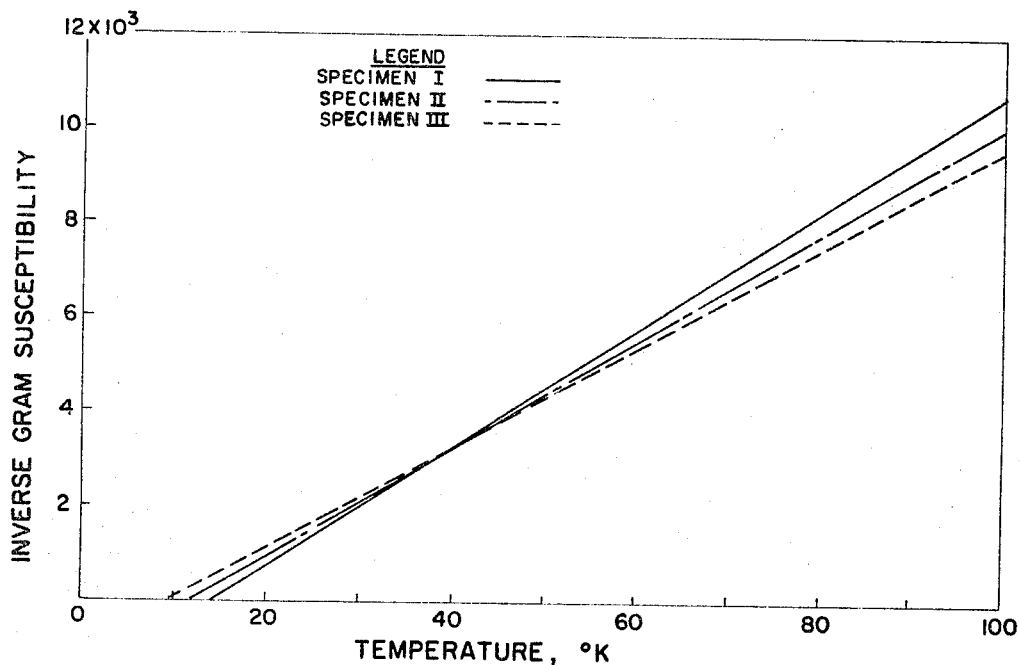

3,320,170
TRANSPARENT MAGNETIC GLASS COMPOSITIONS

Ronald C. Vickery, Okauchee, Wis., and Joseph V. Fisher, Valencia, Pa., assignors to Semi-Elements, Inc., Saxonburg, Pa., a corporation of Pennsylvania
Filed Aug. 9, 1965, Ser. No. 478,202
9 Claims. (Cl. 252—62.5)

This application is a continuation-in-part of copending application Ser. No. 216,073, filed Aug. 10, 1962, now abandoned.

This invention relates to the manufacture of glassy substances possessing the characteristic of being magnetically susceptible, and more particularly to glasses of the type described which are also water-white transparent, i.e., colorless.

As is known, a magnetically susceptible substance is one which is capable of being permeated by a magnetic field and to be attracted by such a field. Well known materials possessing such characteristics are iron, nickel, cobalt, gadolinium and alloys of such metals. The theoretical analysis of magnetism demonstrates the requirement, for attainment of magnetic properties in a molecular matrix, of an interatomic spacing such that unpaired electrons of atoms are so affected by atomic force fields as to align their spin moments in parallelity. In alloys, where interatomic spacings can be well determined and one is dealing with metallic characteristics, attainment of such criteria is relatively easily achieved. However, in non-metallic systems where charged ions rather than atoms, are involved, attainment of the necessary interatomic distance for spin alignment is difficult because of charge repulsion effects. Consequently, few compositions have thus far been known in which ionic interaction has been achieved which permits electron spin alignment and thus attainment of magnetic properties. Many paramagnetic materials are known—paramagnetism being defined as magnetic reaction solely related to the average magnetic moment of unpaired, but unaligned, electron spins. But selection and establishment of structural lattices which permit spin alignment of ionic moments is difficult. Such selection and establishment is known, for example, in crystalline solids such as the yttrium iron garnets and their substituted species; but in these and similar materials a rigid crystalline network is required and the degree of spin alignment of the iron ions is achieved by rigid adjustment of the interatomic distance. This rigid adjustment also affects the energy levels to which the interacting ions attain so that the reacting matrix absorbs electromagnetic energy in the visible part of the spectrum (i.e., the crystalline solids are opaque between about 2,000 and 10,000 A.).

Non-magnetic glasses containing rare earth element oxides are disclosed in U.S. Patents Nos. 2,805,166, 3,032,428 and 3,080,328. These glasses contain silicon in major or minor amounts.

Colored or tinted glasses containing rare earth element oxides are disclosed in U.S. Patents Nos. 2,552,125 and 2,916,387. These glasses are not water-white transparent as are the glasses of the invention.

A transparent ferromagnetic glass is disclosed in U.S. Patent No. 3,043,654. This glass, however, is red and consists mainly of calcium, iron and oxygen.

Except for the compositions to be disclosed, we are not aware of any non-crystalline solid which is both magnetic and water-white transparent, be it crystalline, amorphous or vitreous.

The attainment of a water-white transparent magnetic material would be of high value in electro optics as, by its use, and application of the principle of Faraday rotation, means is then provided for the modulation of a light beam by application of a magnetic field to the water-white transparent magnetic body through which the polarized light beam is passed.

An essential feature of any such magnetic, water-white transparent body, therefore, resides in the attainment of a lattice which permits ionic interaction and alignment of unpaired electron spins whilst retaining a small energy gap between the electron levels such that no absorption occurs of energy in the visible region of the electromagnetic spectrum. We have discovered systems permitting such interaction between strongly paramagnetic ions.

Figure 1:
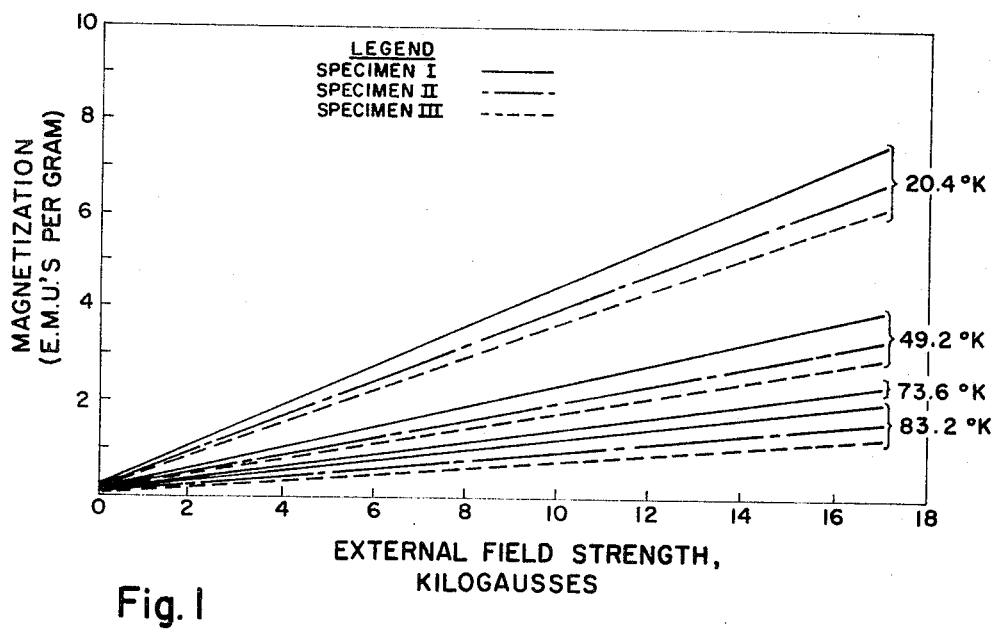

The present invention will now be described with reference to the accompanying drawings, in which:

FIGURE 1 is a graph illustrating the magnetization produced in three specimens of the invention, by an external magnetic field, at various temperatures; and FIG. 2 is a graph illustrating the variation in inverse gram susceptibility of the same three samples as a function of temperature.

The present invention resides in the discovery that glasses, particularly those based upon phosphate, borate and fluoride matrices, can be doped with rare earths selected from the group consisting of gadolinium, dysprosium, holminum and thulium within certain weight ranges to produce a glass which is not only magnetic at room temperature but which is at the same time water-white transparent and capable of transmitting a portion of the electromagnetic spectrum from about 2,200 A. to about 27,000 A. In accordance with the invention, the glasses of the invention contain up to about 60% by weight of a matrix selected from the group consisting of phosphate, borate and fluoride matrices, up to 50% of an oxide selected from the group consisting of calcium oxide (CaO), strontium oxide (SrO) and barium oxide (BaO) and at least 20% by weight of an oxide of the rare earths selected from the group consisting of gadolinium, dysprosium, holmium and thulium. Preferably, the rare earth element oxide is gadolinium oxide.

In its broader aspects, the invention contemplates the addition of paramagnetic ions comprising rare earth elements, to any glass comprising an inorganic product of fusion which cools to a rigid condition without recrystallization. The glasses of the invention preferably are based upon a borate, phosphate or fluoride matrix.

In the manufacture of the glasses of the invention, a rare earth element, preferably in the form of an oxide, is mixed with the base materials of the glass and melted. Upon cooling, a glassy product is formed which is both magnetically susceptible and water-white transparent.

To demonstrate the magnetinc susceptibility of such glasses, three specimens were prepared having compositions summarized below wherein the amount of each component is given in parts by weight.

| Component | Specimen | | |
|---|---|---|---|
| | I | II | III |
| Gadolinium Oxide | 4 | 4 | 4 |
| Boron Oxide | 9 | 9 | 9 |
| Calcium Oxide | 4 | | |
| Strontium Oxide | | 4 | |
| Barium Oxide | | | 4 |

Each of these samples was subjected to a series of tests, the results of which are graphically illustrated in FIGS. 1 and 2. FIG. 1, for example, illustrates the magnitude of magnetization possible with each sample as a function of an applied external magnetic field and at various temperatures. FIG. 2, on the other hand, illustrates the magnetization of the three samples as a function of temperature.

The present invention also resides in the discovery that the magnetic behavior and the Curie temperature (i.e., that temperature at which the material loses its magnetism) can be varied by compositional changes. For example, one part of gadolinium oxide was melted together with two parts of sodium borate, and two parts of barium oxide. The resultant glass was water-white transparent and had a Curie temperature of 297° K. with a saturation magnetization temperature extrapolated to 0° K. of 13.3.

As another example, eight parts of gadolinium oxide, ten parts of sodium borate, nine parts of barium oxide, and fourteen parts of boron oxide were melted together. The resulting glass, upon cooling, had a Curie temperature of 297° K. and a saturation magnetization temperature, extrapolated to 0° K. of 45.4.

As still another example, one part of gadolinium oxide was melted together with two parts of boron oxide and one part of calcium carbonate. The resulting glass upon cooling had a Curie temperature of 308° K. and a saturation magnetization temperature extrapolated to 0° K. of 60.

As still another example, four parts of gadolinium oxide were melted together with eight parts of boric oxide and five parts of strontium carbonate. The resulting glass was optically transparent, that is, water-white, had an extrapolated saturation magnetization of 60 at 0° K., and a Curie temperature of 287° K.

Similarly, gadolinium oxide can be dissolved in barium crown glasses yielding again water-white transparent magnetic glasses. Furthermore, dysprosium oxide was dissolved in a borate glass and holmium oxide was dissolved in sodium metaphosphate glass. In all instances, water-white transparency was maintained and magnetic values depended upon the rare earth ion concentration.

Although the invention has been shown in connection with certain specific examples, it will be readily apparent to those skilled in the art that various changes in composition may be made to suit requirements without departing from the spirit and scope of the invention.

We claim as our invention:

1. A glass composition exhibiting magnetic characteristics, consisting essentially of a glass matrix selected from the group consisting of phosphate, borate and fluoride matrices, the glass being water-white transparent and containing a paramagnetic ion at least in an amount sufficient to render the glass magnetically susceptible.

2. A glass composition exhibiting magnetic characteristics, consisting essentially of a glass matrix selected from the group consisting of phosphate, borate and fluoride matrices, the glass being water-white transparent and containing at least 20% by weight of a paramagnetic ion.

3. A glass composition exhibiting magnetic characteristics, consisting essentially of a glass matrix selected from the group consisting of phosphate, borate and fluoride matrices, the glass being water-white transparent and containing about 20% to 75% by weight of a paramagnetic ion.

4. A glass composition exhibiting magnetic characteristics, consisting essentially of a glass matrix selected from the group consisting of phosphate, borate and fluoride matrices, the glass being water-white transparent and containing at least 20% of a paramagnetic ion selected from the group consisting of gadolinium, dysprosium, holmium and thulium.

5. A glass composition exhibiting magnetic properties and consisting essentially of up to 60% by weight of a matrix selected from the group consisting of phosphate, borate and fluoride matrices, up to 50% by weight of an oxide selected from the group consisting of calcium oxide, strontium oxide and barium oxide, and at least 20% by weight of a rare earth oxide selected from the group consisting of gadolinium oxide, dysprosium oxide, holmium oxide and thulium oxide, said glass being water-white transparent.

6. A glass composition exhibiting magnetic properties and being water-white transparent, consisting essentially of boron oxide, barium oxide and gadolinium oxide, said gadolinium oxide being present at least in an amount sufficient to render the resultant glass magnetically susceptible.

7. A glass composition exhibiting magnetic properties and being water-white transparent, consisting essentially of boron oxide, strontium oxide and gadolinium oxide, said gadolinium oxide being present at least in an amount sufficient to render the resultant glass magnetically susceptible.

8. A glass composition exhibiting magentic properties and being water-white transparent, consisting essentially of boron oxide, calcium oxide and gadolinium oxide, said gadolinium oxide being present at least in an amount sufficient to render the resultant glass magnetically susceptible.

9. A glass composition exhibiting magnetic characteristics, consisting essentially of a glass matrix selected from the group consisting of phosphate, borate and fluoride matrices, the glass being water-white transparent and containing a paramagnetic ion selected from the group consisting of gadolinium, dysprosium, holmium and thulium, said paramagnetic ion being present at least in an amount suffifficient to render the resultant glass magnetically susceptible.

References Cited by the Examiner
UNITED STATES PATENTS

| | | | |
|---|---|---|---|
| 2,805,166 | 9/1957 | Loffler | 106—52 |
| 3,081,178 | 3/1963 | Weissenberg et al. | 106—470 |

OTHER REFERENCES

Morey: Properties of Glass, 1954, Reinhold Publishing Co., p. 543.

TOBIAS E. LEVOW, *Primary Examiner.*

R. D. EDMONDS, *Assistant Examiner.*